(12) United States Patent
Slik

(10) Patent No.: US 10,055,317 B2
(45) Date of Patent: Aug. 21, 2018

(54) DEFERRED, BULK MAINTENANCE IN A DISTRIBUTED STORAGE SYSTEM

(71) Applicant: NetApp, Inc., Sunnyvale, CA (US)

(72) Inventor: David Anthony Slik, Northridge, CA (US)

(73) Assignee: NetApp, Inc., Sunnyvale, CA (US)

( * ) Notice: Subject to any disclaimer, the term of this patent is extended or adjusted under 35 U.S.C. 154(b) by 155 days.

(21) Appl. No.: 15/076,873

(22) Filed: Mar. 22, 2016

(65) Prior Publication Data

US 2017/0277609 A1 Sep. 28, 2017

(51) Int. Cl.
| G06F 11/00 | (2006.01) |
| G06F 11/20 | (2006.01) |
| G06F 3/06 | (2006.01) |

(52) U.S. Cl.
CPC .......... *G06F 11/2094* (2013.01); *G06F 3/067* (2013.01); *G06F 3/0619* (2013.01); *G06F 3/0647* (2013.01); *G06F 2201/805* (2013.01)

(58) Field of Classification Search
CPC ...... G06F 3/0619; G06F 3/0647; G06F 3/067; G06F 11/2094; G06F 2201/805
See application file for complete search history.

(56) References Cited

U.S. PATENT DOCUMENTS

| 4,543,654 A | 9/1985 | Jones |
| 6,115,200 A | 9/2000 | Allen et al. |
| 6,505,216 B1 | 1/2003 | Schutzman et al. |
| 6,714,371 B1 | 3/2004 | Codilian |
| 6,735,033 B1 | 5/2004 | Codilian et al. |
| 7,177,248 B2 | 2/2007 | Kim et al. |
| 7,333,282 B2 | 2/2008 | Iseri et al. |
| 7,408,732 B2 | 8/2008 | Kisaka et al. |
| 8,099,605 B1 | 1/2012 | Billsroem et al. |
| 8,239,621 B2 | 8/2012 | Yamato |

(Continued)

FOREIGN PATENT DOCUMENTS

WO 2013152811 A1 10/2013

OTHER PUBLICATIONS

International Search Report and Written Opinion for Application No. PCT/US2015/048177 dated Dec. 10, 2015, 8 pages.

(Continued)

*Primary Examiner* — Joshua P Lottich
(74) *Attorney, Agent, or Firm* — Gilliam IP PLLC

(57) ABSTRACT

Failed capacity of a distributed storage system is determined. The distributed storage system includes a plurality of storage nodes, wherein the plurality of storage nodes include at least one storage device to store data objects, wherein the data objects have been divided into constituent fragments in the distributed storage system. Protection capacity of the distributed storage system is determined. Protection capacity includes the data fragments generated to allow the data objects to be rebuilt in response to at least a part of the data objects being either lost or corrupted. A probability is determined that the failed capacity overlaps with the used capacity of the distributed storage system prior to a next periodically scheduled maintenance of the distributed storage system. In response to the probability exceeding a risk threshold, a next maintenance of the distributed storage system is scheduled that comprises reducing the failed capacity.

20 Claims, 8 Drawing Sheets

(56) References Cited

U.S. PATENT DOCUMENTS

| | | | |
|---|---|---|---|
| 8,566,520 B1 | 10/2013 | Bitner et al. | |
| 8,625,636 B2 | 1/2014 | Baptist et al. | |
| 8,768,983 B2 | 7/2014 | Kohlscheen et al. | |
| 8,819,259 B2 | 8/2014 | Zuckerman et al. | |
| 8,838,911 B1 | 9/2014 | Hubin et al. | |
| 8,949,449 B2 | 2/2015 | Zuckerman et al. | |
| 8,959,281 B1 | 2/2015 | Malina et al. | |
| 8,959,305 B1 | 2/2015 | Lecrone et al. | |
| 8,990,162 B1 | 3/2015 | Kushwah et al. | |
| 9,269,376 B1 | 2/2016 | Hess et al. | |
| 9,329,991 B2 | 5/2016 | Cohen et al. | |
| 9,361,301 B1 | 6/2016 | Bushman | |
| 2002/0095546 A1 | 7/2002 | Dimitri et al. | |
| 2003/0105852 A1 | 6/2003 | Das et al. | |
| 2004/0162940 A1 | 8/2004 | Yagisawa et al. | |
| 2004/0213149 A1* | 10/2004 | Mascolo | H04J 3/085 370/229 |
| 2006/0253651 A1* | 11/2006 | Inoue | G06F 11/1666 711/114 |
| 2006/0271339 A1 | 11/2006 | Fukada | |
| 2007/0104049 A1 | 5/2007 | Kim et al. | |
| 2007/0113004 A1* | 5/2007 | Sugimoto | G06F 3/0608 711/112 |
| 2007/0156405 A1 | 7/2007 | Schulz et al. | |
| 2007/0177739 A1 | 8/2007 | Ganguly et al. | |
| 2007/0203927 A1 | 8/2007 | Cave et al. | |
| 2008/0126357 A1 | 5/2008 | Casanova et al. | |
| 2008/0151724 A1 | 6/2008 | Anderson et al. | |
| 2008/0201336 A1 | 8/2008 | Yamato | |
| 2008/0201401 A1 | 8/2008 | Pugh et al. | |
| 2008/0313398 A1 | 12/2008 | Koseki | |
| 2009/0100055 A1 | 4/2009 | Wang | |
| 2009/0154559 A1 | 6/2009 | Gardner | |
| 2009/0327840 A1 | 12/2009 | Moshayedi | |
| 2010/0030960 A1 | 2/2010 | Kamalavannan et al. | |
| 2010/0064166 A1 | 3/2010 | Dubnicki et al. | |
| 2010/0094921 A1 | 4/2010 | Roy et al. | |
| 2010/0094957 A1 | 4/2010 | Zuckerman et al. | |
| 2010/0095060 A1 | 4/2010 | Strange et al. | |
| 2010/0162031 A1 | 6/2010 | Dodgson et al. | |
| 2010/0185690 A1 | 7/2010 | Evans et al. | |
| 2010/0293354 A1 | 11/2010 | Perez et al. | |
| 2010/0306174 A1 | 12/2010 | Otani | |
| 2010/0325345 A1* | 12/2010 | Ohno | G06F 11/108 711/103 |
| 2011/0191629 A1 | 8/2011 | Daikokuya et al. | |
| 2011/0296104 A1 | 12/2011 | Noda et al. | |
| 2012/0060072 A1 | 3/2012 | Simitci et al. | |
| 2012/0072689 A1 | 3/2012 | Van Kempen et al. | |
| 2013/0054889 A1 | 2/2013 | Vaghani et al. | |
| 2013/0086340 A1* | 4/2013 | Fleming | H04L 69/40 711/161 |
| 2013/0238235 A1 | 9/2013 | Kitchel et al. | |
| 2013/0297905 A1* | 11/2013 | Yang | G06F 12/02 711/165 |
| 2013/0346794 A1* | 12/2013 | Bartlett | G06F 11/2094 714/6.21 |
| 2014/0013046 A1 | 1/2014 | Corbett et al. | |
| 2014/0108707 A1 | 4/2014 | Nowoczynski et al. | |
| 2014/0207899 A1 | 7/2014 | Mark et al. | |
| 2014/0237024 A1 | 8/2014 | Chen et al. | |
| 2014/0297680 A1 | 10/2014 | Triou, Jr. et al. | |
| 2014/0331085 A1 | 11/2014 | Dhuse et al. | |
| 2014/0344532 A1 | 11/2014 | Lazier | |
| 2015/0067245 A1 | 3/2015 | Kruger | |
| 2015/0161163 A1 | 6/2015 | Cypher et al. | |
| 2015/0256577 A1 | 9/2015 | Gutiérrez Vilaró et al. | |
| 2015/0269964 A1 | 9/2015 | Fallone et al. | |
| 2015/0363126 A1 | 12/2015 | Frick | |
| 2015/0378825 A1 | 12/2015 | Resch | |
| 2016/0070617 A1* | 3/2016 | Algie | G06F 11/1076 714/766 |
| 2016/0179621 A1 | 6/2016 | Schirripa et al. | |
| 2016/0232168 A1 | 8/2016 | Lemoal | |
| 2016/0314043 A1 | 10/2016 | Slik | |
| 2017/0031752 A1* | 2/2017 | Cilfone | H04L 63/108 |
| 2017/0060481 A1* | 3/2017 | Leggette | G06F 3/0659 |
| 2017/0109247 A1* | 4/2017 | Nakajima | G06F 11/2069 |
| 2017/0277590 A1* | 9/2017 | Luse | G06F 11/1076 |

OTHER PUBLICATIONS

Rabin "Efficient Dispersal of Information for Security, Load Balancing, and Fault Tolerance," Journal of the Association for Computing Machinery, vol. 36, No. 2, Apr. 1989, pp. 335-348.

Amer, et al., "Design Issue for a Shingled Write Disk System," 26th IEEE Symposium on Massive Storage Systems and Technologies (MSST 2010), May 2010,12 pages, retrieved on Oct. 20, 2015 from http://storageconference.us/2010/Papers/MSST/Amer.pdf.

Amer, et al.,"Data Management and Layout for Shingled Magnetic Recording," IEEE Transactions on Magnetics, Oct. 2011,vol. 47, No. 10,pp. 3691-3697, retrieved on Oct. 15, 2015 from http://www.ssrc.ucsc.edu/Papers/amer-ieeetm11.pdf.

Dunn, et al., "Shingled Magnetic Recording Models, Standardization, and Applications," SNIA Education, Storage Networking Industry Association, , Sep. 16, 2014, 44 pages, retrieved on Oct. 21, 2015 from http://www.snia.org/sites/default/files/Dunn-Feldman_SNIA_Tutorial_Shingled_Magnetic_Recording-r7_Final.pdf.

Feldman, et al., "Shingled Magnetic Recording Areal Density Increase Requires New Data Management," USENIX, The Advanced Computing Systems Association, Jun. 2013, vol. 38, No. 3, pp. 22-30, retrieved on Oct. 20, 2015 from https://www.cs.cmu.edu/~garth/papers/05_feldman_022-030_final.pdf.

Gibson, et al., "Direction for Shingled-Write and Two-Dimensional Magnetic Recording System Architectures: Synergies with Solid-State Disks," Carnegie Mellon University, Parallel Data Lab, Technical Report CMU-PDL-09-104, May 2009, 2 pages, retrieved on Oct. 20, 2015 from http://www.pdl.cmu.edu/PDL-FTP/PDSI/CMU-PDL-09-104.pdf.

Gibson, et al., "Principles of Operation for Shingled Disk Devices," Carnegie Mellon University, Parallel Data Laboratory, CMU-PDL-11-107, Apr. 2011, 9 pages, retrieved on Oct. 20, 2015 from http://www.pdl.cmu.edu/PDL-FTP/Storage/CMU-PDL-11-107.pdf.

Li, X., "Reliability Analysis of Deduplicated and Erasure-Coded Storage," ACM SIGMETRICS Performance Evaluation Review, vol. 38, No. 3, ACM New York, NY, Jan 3, 2011, pp. 4-9.

Luo, "Implement Object Storage with SMR based Key-Value Store," 2015 Storage Developer Conference, Huawei Technologies Co., Sep. 2015, 29 pages, retrieved on Oct. 20, 2015 from http://www.snia.org/sites/default/files/SDC15_presentations/smr/QingchaoLuo_Implement_Object_Storage_SMR_Key-Value_Store.pdf.

Megans, "Spectra Logic Announces Breakthrough in Nearline Disk, ArcticBlue," Specta Logic, Boulder, CO, Oct. 15, 2015, 5 pages, retrieved on Oct. 20, 2015 from https://www.spectralogic.com/2015/10/15/spectra-logic-announces-breakthrough-in-nearline-disk-arcticblue/.

O'Reily; J., "RAID Vs. Erasure Coding", Network Computing,Jul. 14, 2014, 2 pages, retrieved on Apr. 1, 2016 from http://www.networkcomputing.com/storage/raid-vs-erasure-coding/1792588127.

Renzoni, R., "Wide Area Storage From Quantum," Quantum Corporation, 2012, 24 pages.

Seshadri S., "High Availability and Data Protection with EMC Isilon Scale-Out NAS," EMC Corporation, White Paper, Jun. 2015, 37 pages, retrieved on Oct. 5, 2015 from https://www.emc.com/collateral/hardware/white-papers/h10588-isilon-data-availability-protection-wp.pdf.

SMR Layout Optimisation for XFS, Mar. 2015, v0.2, 7 pages, retrieved on Oct. 15, 2015 from http://xfs.org/images/f/f6/Xfs-smr-structure-0.2.pdf.

Speciale P., "Scality RING: Scale Out File System & Hadoop over CDMI," Scality, Storage Developer Conference, Sep. 19-22, 2014, 26 pages, retrieved on Oct. 5, 2015 from http://www.snia.org/sites/default/files/PaulSpeciale_Hadoop_Ring.pdf.

(56) References Cited

OTHER PUBLICATIONS

Suresh, et al., "Shingled Magnetic Recording for Big Data Applications," Parallel Data Laboratory, Carnegie Mellon University, Pittsburg, PA, CMU-PDL-12-105, May 2012, 29 pages, retrieved on Oct. 20, 2015 from http://www.pdl.cmu.edu/PDL-FTP/FS/CMU-PDL-12-105.pdf.

\* cited by examiner

BULK MAINTENANCE SCHEDULE PLAN

702 — Procedures

| Procedures | Deadline | Schedule | Notes |
|---|---|---|---|
| 704 — Expansion | 2014-05-15 | 2014-05-15 | in progress, completion overdue |
| 706 — Component Replacement #1 | 2014-07-01 | 2014-07-01 | scheduled |
| 708 — Component Replacement #2 | 2014-07-01 | 2014-07-01 | scheduled |

710 — Expansion

| Directions | Verified |
|---|---|
| 712 — 1. Step A | Yes |
| 2. Step B | Yes |
| o | o |
| o | o |
| o | o |
| 10. Step X | No |

714 — Component Replacement #1

| Directions | Verified |
|---|---|
| 716 — 1. Step A | |
| 2. Step B | |

718 — Component Replacement #2

| Directions | Verified |
|---|---|
| 720 — 1. Step A | |
| 2. Step B | |

FIG. 7

DEFERRED, BULK MAINTENANCE IN A DISTRIBUTED STORAGE SYSTEM

BACKGROUND

The disclosure generally relates to the field of data processing, and more particularly to deferred, bulk maintenance in a distributed storage system.

The amount of data enterprises store has increased at an incredible rate. Research firms present statistics that data is being generated at a rate of multiple exabytes of data per day. For large amounts of inactive data (i.e., data that is rarely accessed), low cost storage solutions are offered. These low cost storage solutions take advantage of the low cost storage devices, which can have corresponding higher failure rates.

BRIEF DESCRIPTION OF THE DRAWINGS

Aspects of the disclosure may be better understood by referencing the accompanying drawings.

FIG. 7 depicts an example Graphical User Interface (GUI) display of a bulk maintenance schedule plan.

DESCRIPTION

Figure 1:
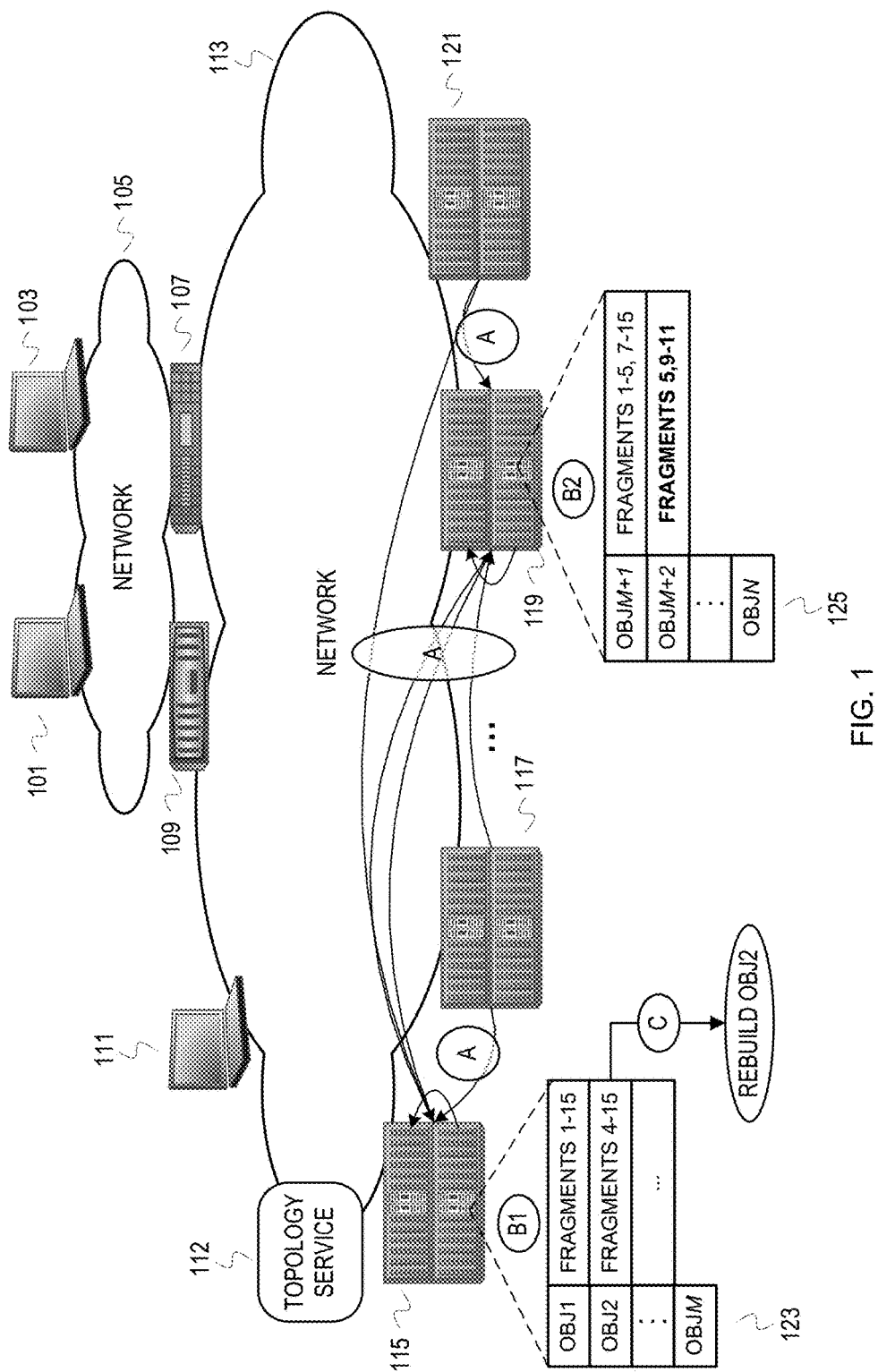
FIG. 1 depicts an example distributed storage system for rebuilding of data objects based on object loss risk assessment.

The description that follows includes example systems, methods, techniques, and program flows that embody aspects of the disclosure. However, it is understood that this disclosure may be practiced without these specific details. For instance, this disclosure refers to erasure coding in illustrative examples. But aspects of this disclosure can be applied to other types of coding techniques can be employed for the protection and storage of data. In other instances, well-known instruction instances, protocols, structures and techniques have not been shown in detail in order not to obfuscate the description.

Introduction

Lower reliability is a common, and likely expected, characteristic of low cost storage devices. The lower reliability in combination with the massive scale of data (e.g., petabytes to exabytes of data) impairs and exceeds the protective capability of RAID 5 and RAID 6. Erasure coding techniques with an m greater than 2 (k=number of data fragments, m=additional fragments for protection) can be used to satisfy the demands of greater data reliability on less reliable storage devices. With a protection technique that divides data objects into multiple fragments and a greater number of additional fragments for protection, the amount of data being stored grows further. For instance, a protection technique could use a hierarchical erasure coding technique: divide an object into 18 fragments and then divide each of those fragments into 18 fragments. For that single data object, a storage system will maintain 324 entries to locate the 324 fragments. Since an enterprise likely maintains a single namespace, at least within departments of an enterprise if not across the enterprise, a database of location indices or a directory for a million objects will have hundreds of millions of entries to locate protected data. Furthermore, an enterprise likely uses distributed storage spanning a number of geographically diverse locations. Thus, the database with hundreds of millions of entries will have synchronization requirements. Such an immense database can impede data protection because maintaining synchronization and accessing the database can be a bottleneck for proactively rebuilding data in a distributed, large scale storage system.

Overview

Some aspects include a deferred, bulk maintenance of a distributed storage system. Deferred, bulk maintenance can include replacement of failed storage drives, repair of broken connectivity with storage drives, adding new storage drives to increase storage capacity, retiring obsolete storage drives, replacement of failed storage nodes, repair of broken connectivity with storage nodes, adding new storage nodes to increase system capacity, retiring obsolete storage nodes, etc.

Proactively rebuilding data objects can be done in a distributed, large scale storage system without a centralized and/or synchronized database or directory for locating the data objects (hereinafter "object location index"). A rebuild node or nodes of the storage system can assess risk of the storage system not being able to provide a data object (i.e., not being able to rebuild the data object). The rebuild node(s) uses information about data object fragments to determine health of a data object (hereinafter "object"), which relates to the risk assessment. The rebuild node(s) obtains object fragment information from nodes throughout the storage system. The nodes can push the object fragment information to the rebuild node(s) or the rebuild node(s) can pull the information from the nodes. With the object fragment information, the rebuild node(s) can assess object risk based, at least in part, on the object fragments indicated as existing by the nodes. To assess object risk, the rebuild node(s) treats absent object fragments (i.e., those for which an indication was not received) as lost. When too many object fragments are lost, an object cannot be rebuilt. The erasure coding technique dictates the threshold number of fragments for rebuilding an object—the closer to the threshold the greater the risk of not being able to rebuild the object. If additional risk related information is available from the storage controllers, for example information from a Self-Monitoring, Analysis, and Reporting Technology (S.M.A.R.T.) system, the rebuild node(s) can incorporate this information into the risk assessment.

Because data objects are stored across multiple object fragments in at least one storage node and multiple storage devices within such storage nodes based on coding techniques (e.g., erasure coding), a data object can still be rebuilt if some of its object fragments are lost. Thus, a data object can still be rebuilt even if some storage devices storing its object fragments have failed. Therefore, replacement of failed storage devices is not necessarily required to occur immediately to preclude data loss in these distributed storage systems. In other words, some aspects include a storage system that has a much higher tolerance for failures.

Some aspects include a deferred, bulk maintenance to perform any repairs of failed storage devices and adding of new storage devices to increase storage expansion. Because maintenance can be deferred and performed in bulk (not time critical), the cost of maintenance can be less in comparison to other conventional storage systems (e.g., RAID-based storage systems) that require immediate action when a storage device has failed to preclude data loss. In these conventional storage systems, personnel need to be in the data center to monitor and replace failed storage devices as soon as failure occurs. In contrast, instead of requiring maintenance as soon as a storage device has failed or is at risk of failing, some aspects allow maintenance to be batched and then performed at some later time.

Periodic deferred, bulk maintenance of the distributed storage system can be scheduled. For example, an administrator can schedule maintenance of the storage system to be performed once every N number of months, once per year, once every X number of years, etc. Some aspects can schedule additional maintenance (intermittent maintenance) between the periodic maintenance based on various current and projected capacities of the storage system. For example, a used storage capacity and a failed storage capacity of the storage system can be monitored and projected into the future. Projected failed and used storage capacity of the storage system can be based on a past failure rate and past utilization trends of the particular storage system or a similarly configured storage system. Based on a comparison of the projected used storage capacity versus the failed storage capacity, a risk assessment can be performed to determine a probability of data loss if maintenance of the storage system is deferred until the next periodically scheduled maintenance. If the probability of data loss is too high based on the risk assessment, an additional maintenance can be scheduled prior to the next periodically scheduled maintenance. The additional maintenance can be scheduled immediately or any time prior to the next periodically scheduled maintenance.

Accordingly, some aspects allow deferred, bulk maintenance to be predictive based on projections of failed and used storage capacities whose projections can be derived from past failure rates and usage trends. For example, if usage rates dramatically increase, the deferred, bulk maintenance can be scheduled earlier that the next periodic scheduled maintenance to expand storage capacity by adding storage devices and repair failed storage devices in the storage system. Predictive trending can be made to determine when failed storage capacity will overlap with the used capacity of the storage system. Based on this predictive trending, maintenance operations can then be initiated to expand storage capacity and repair failed storage devices prior to failed storage capacity overlapping with the used capacity for the storage system.

Example System Architecture

An example system architecture for a distributed storage system is now described. FIG. 1 depicts an example distributed storage system for rebuilding of data objects based on object loss risk assessment. The storage system includes racks 115, 117, 119, and 121. Each of the racks houses four storage nodes in FIG. 1, with each storage node managing access to a set of storage devices (e.g., disk drives, flash drives, tape drives, or a combination of different storage media). The racks 115, 117, 119, and 121 may also house network elements to allow for network based communication among the components within the rack. The storage nodes of the racks 11, 115, 119, and 121 communicate with each other over a network 113. The storage devices of the racks 115, 117, 119, 121 host data objects for clients of the storage system. The storage system can be a cloud based storage solution. Data objects stored into the storage system are protected according to an erasure coding technique with the number of additional fragments for protection (m) being greater than 2. Thus, the storage system fragments a data object into n fragments (n=k+m) and distributes the fragments across the storage nodes.

The storage system also includes intermediary storage nodes 109 and 107. The intermediary storage nodes 107, 109 are client facing nodes that receive requests before being transmitted to the storage nodes within the racks 115, 117, 119, and 121. The intermediary storage nodes 107, 109 can host middleware that accepts application programming interface (API) based calls (e.g., a SWIFT call, S3 call, etc.). These intermediary storage nodes 107, 109 may also perform load balancing, or other devices not depicted can intercept requests and perform load balancing. Client devices 101, 103 submit requests to the intermediary storage nodes 107, 109 via a network 105. FIG. 1 also depicts a device 111 associated with the network 113 to suggest the possibility that the device 111 can interact with the storage nodes of the racks 115, 117, 119, and 121 without an intermediary storage node. For instance, the device 111 may be an administrator device.

FIG. 1 is annotated with a series of letters A-C. These letters represent stages of operations, with each stage representing one or more operations. Although these stages are ordered for this example, the stages illustrate one example to aid in understanding this disclosure and should not be used to limit the claims. Subject matter falling within the scope of the claims can vary with respect to the order and some of the operations.

At stage A, designated storage nodes of the racks 115, 119 receive object fragment information and perform per object risk assessment based on the object fragment information. The designated storage nodes are designated by configuration and/or periodic election before collection of object fragment information. The namespace is divided among these designated storage nodes ("rebuild" nodes) to distribute the work. For reliability, the rebuild nodes may have restrictions, such as satisfying a performance criterion (e.g., minimum amount of low latency memory) and located within mutually exclusive racks. The namespace can be divided by computing hashes of the object identifiers and then a modulo operation to achieve the work division by hashed namespace region. The storage nodes, including the rebuild nodes, may periodically provide ("push") the object fragment information for risk assessment. Instead of a push technique, the rebuild nodes can request ("pull") object fragment information periodically and/or depending on storage system status (e.g., current load on the storage system, or load on the rebuild nodes). In a pull scenario, the rebuild nodes multicast requests for the object fragment information to available storage nodes. In a push scenario, the rebuild nodes multicast notifications of their designations as rebuild nodes. In either case, the rebuild nodes determine available storage nodes throughout the storage system for these multicasts by communicating with a topology service 112. The topology service 112 maintains current topology of the storage system. Topology of the system at least includes identification of storage nodes known as members of the storage system and operating status of those storage nodes. Topology information can include additional information, such as network connectivity (e.g., distance between nodes in terms of latency or links). Stage A is depicted multiple times in FIG. 1 to encompass the transmissions of object fragment information from the storage nodes throughout the storage system. In some cases, a storage node(s) may be unexpectedly unavailable (e.g., failure, network disruption) or expectedly unavailable (e.g., maintenance). Object fragment information collection can account for expected unavailability of storage nodes or storage devices (e.g., scheduling collection for a different time, at least for the affected device(s)).

At stages B1 and B2, the rebuild nodes assess risk of losing objects using the object fragment information. The object fragment information identifies the object fragments currently available in the storage system. The responding storage nodes across the racks 115, 117, 119, 121 maintain local fragment store indices that identify the object fragments stored in the corresponding storage devices. If a storage device becomes unavailable, the corresponding storage node will update the local fragment store index to indicate that all of the object fragments on that storage device are unavailable. The storage node will also update the local fragment store index to indicate an object fragment is unavailable if an attempted retrieval of the object fragment fails. For object fragment information collection, the storage nodes will traverse the local fragment store index and communicate identifiers of the object fragments represented in the local fragment store index. Since the rebuild nodes do not rely on a centralized/synchronized object location index, the rebuild nodes use the communicated object identifiers from the storage nodes throughout the storage system to determine which object fragments are available for object rebuilds. The rebuild node operates under the assumption that any object fragment for which an identifier is not received is unavailable (e.g., corrupted, erased, etc.). With the object fragment identifiers, the rebuild nodes track available fragments per corresponding object. Effectively, the rebuild nodes take inventory of object fragments for each object by fragment identifiers.

Figure 2:
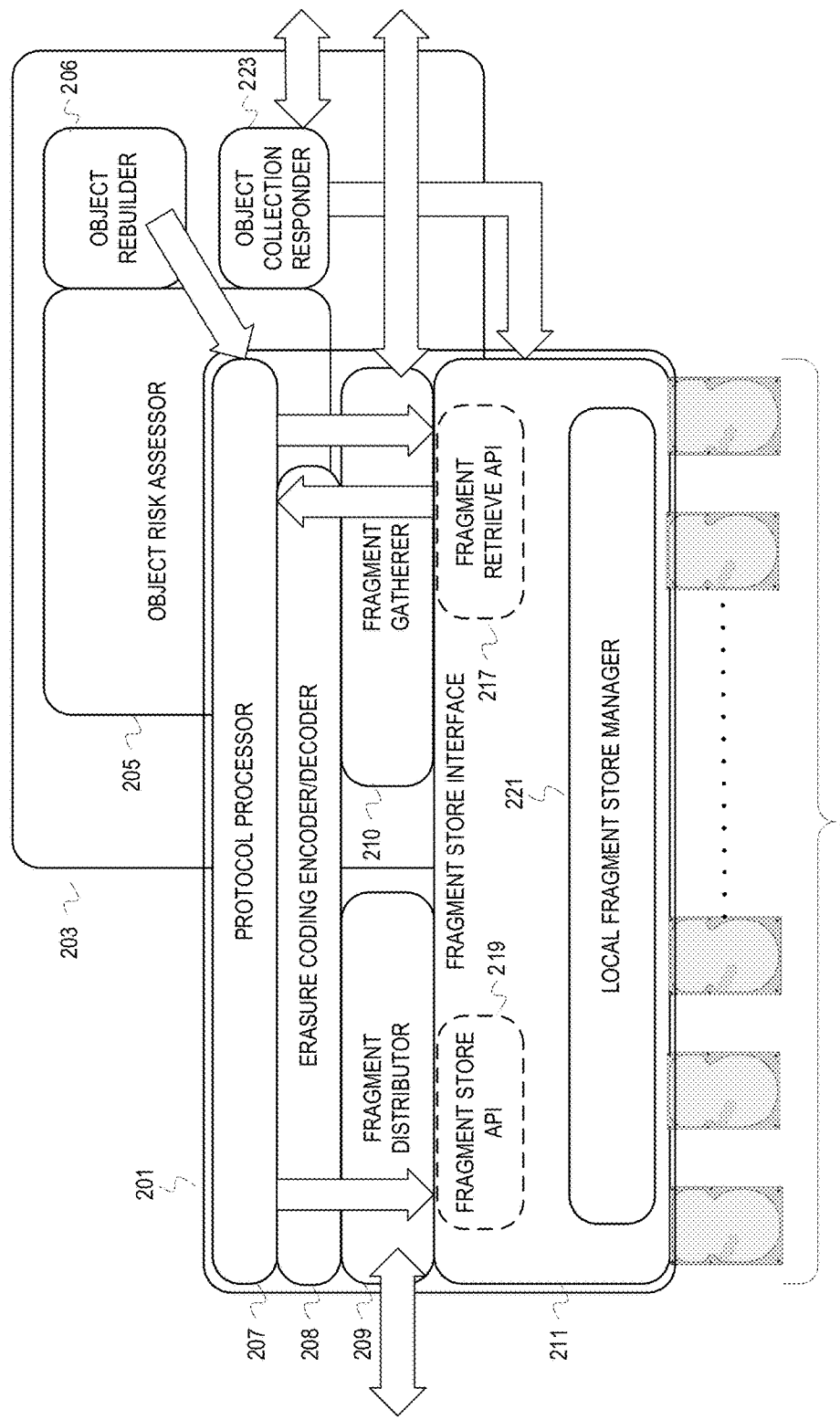
FIG. 2 depicts an example illustration of a storage node architecture.

An example of a rebuild node can aid in understanding the operations of FIG. 1. FIG. 2 depicts an example illustration of a storage node architecture. FIG. 2 depicts architectural components that execute within a foreground execution space 201 and architectural components that execute within a background execution space 203. Any one of the depicted components can be implemented with hardware, such as a field programmable gate array or application specific integrated circuit. Background and foreground execution space are defined by an operating system of the rebuild node. Generally, processes executing in the background will have lower priority for resources than processes in the foreground. This is typically implemented according to a scheduling algorithm. The operating system may distinguish background and foreground execution space with other techniques, such as using process identifiers and allocating distinct memory space for foreground and background processes. The foreground and background distinction can also be expressed as background and foreground tasks instead of processes, with a "task" understood to be a unit of work to be done.

The architectural components that execute within the foreground execution space 201 include a protocol processor 207, an erasure coding encoder/decoder 208, a fragment distributor 209, a fragment gatherer 210, and a fragment store interface 211. The protocol processor 207 processes requests according to one or more protocols used to communicate the requests. The protocol processor 207 decapsulates received protocol data units (e.g., Transmission Control Protocol/Internet Protocol packets). Depending upon the protocol(s), the protocol processor 207 may form a message with decapsulated protocol data units (PDUs) and determine the request (e.g., a hypertext transfer protocol (HTTP) PUT request).

For a store type of request, a store data path traverses the protocol processor 207, the erasure coding encoder/decoder 208, the fragment distributor 209, and possibly the fragment store interface 211. The protocol processor 207 passes a data object to be stored, along with other storage relevant information (e.g., object name), to the erasure coding encoder 208 for fragmenting and encoding. The erasure coding encoder 208 passes the fragments to the fragment distributor 209. The fragment distributor 209 determines target storage nodes for transmitting the fragments. The fragment distributor 209 can access data that indicates target storage nodes available for storing fragments. For example, a listing of open shingled magnetic recording device zones may be communicated among the storage nodes of the storage system. The fragment distributor 209 will pass any fragment(s) to be stored locally to the fragment store interface 211. The fragment store interface 211 will transmit the fragment(s) to be stored locally to one or more of the storage devices 213 managed by the storage node. The fragment store interface 211 includes a local fragment store manager 221. The local store manager 221 maintains a local fragment store index that indicates location (e.g., storage device identifier and zone, sector, block, etc.) of each locally stored fragment. The fragment store interface 211 may also include a fragment store API 219. The fragment distributor 209 would pass data fragments to the fragment store interface 211 according to the fragment store API 219. After the local fragment store manager 221 updates the local fragment store index to reflect a store the local fragment store manager 221 may then transmit the data fragment according to another API or driver (e.g., small computer system interface (SCSI) driver for writing to the storage devices). When fragments, not objects, are transmitted to a storage node for storing, the transmitting storage node uses the fragment store API 219 of the storage node that will store the fragments.

For a retrieval type of request, a retrieve data path traverses the protocol processor 207, the fragment gatherer 210, the fragment store interface 211, and the erasure coding decoder 208. The protocol processor 207 passes retrieval information (e.g., object name) extracted from a protocol message (e.g., HTTP GET request) to the fragment gatherer 210. The fragment gatherer 210 transmits a request for the object throughout the storage system and passes the request for the object to the fragment store interface 211. The fragment store interface 211 may include a fragment retrieve API 217. In that case, the fragment gatherer 210 passes the object request, or just an object identifier, according to the fragment retrieve API 217. The local fragment store manager 221 will then traverse the local fragment store index to determine whether any fragment of the identified object is stored on the storage devices 213. If the local fragment store index indicates that any fragment of the identified object is stored on the storage device 213, then the local fragment store manager 221 will retrieve the fragment(s) and return it to the fragment gatherer 210. For fragments being retrieved by other storage nodes, the other storage nodes submit the fragment retrieval request via the fragment retrieve API 217 and the fragment store interface 211 returns the retrieved fragments to the requesting storage node, instead of the fragment gatherer 210, according to the fragment retrieve API 217. The fragment gatherer 210 provides the gathered fragments, assuming sufficient fragment have been gathered, to the erasure coding decoder 208 for rebuild/forming of the requested object. If insufficient fragments are returned to the fragment gatherer 210, the fragment gatherer 210 will notify the protocol processor 207 that the object retrieval failed. The fragment gatherer 210 can perform other operations, such as logging when an object retrieval fails. Assuming sufficient fragment are gathered, the erasure coded decoder 208 rebuilds the object with the gathered fragments and provides the object to the protocol processor 207 for returning to the requestor.

For execution in the background execution space 203, the architectural components include an object risk assessor 205, an object collection responder 223, and an object rebuilder 206. The object collection responder 223 interacts with the fragment store interface 211 to identify all available locally stored fragment identifiers. The fragment store interface 211 can have a defined function for collecting all fragment identifiers from the local fragment store index for available fragments. The object collection responder 223 communicates the collected object fragment identifiers to an object risk assessor 205 hosted on a rebuild node.

The object risk assessor 205 assesses risk of data loss per object if the storage node that hosts the object risk assessor 205 is designated as a rebuild node. As previously mentioned, the object risk assessor 205 assesses risk of losing an object (i.e., not being able to rebuild an object) based on fragment inventory and the parameters of the erasure code (any k of n fragments needed to rebuild). The object risk assessor 205 can be programmed with a function to quantify risk based on the fragment inventory and/or read a policy that defines the function or a threshold(s). As a simple example, degrees of risk can be defined as follows: high risk=0, at risk=1, nominal risk=2, and low risk=3.The object risk assessor 205 can compute the difference between k and the number of gathered fragments (g) and assign that difference as the risk quantification. The object risk assessor 205 can set a ceiling for differences at 3 to conform to the defined degrees of risk. A risk assessment function can be more complex than computing differences between g and k. For example, an object risk assessor 205 can compute risk coefficients based on health information for storage device, storage nodes, cluster health, etc. If hierarchical erasure coding is used to protect data, then risk coefficients can be computed at each level.

The object rebuilder 206 triggers rebuild of objects determined to be at risk by the object risk assessor 205. For an object identified as at risk by the object risk assessor 205, the object rebuilder 206 communicates a retrieve request that indicates the at risk object. The object rebuilder 206 communicates the retrieve request to the protocol processor 207. For example, the object rebuilder 206 communicates a GET request to the protocol processor 207. This will trigger the retrieve data path for the at risk object. When rebuilt for the retrieval, the object rebuilder 206 can then communicate a store request or chain a store request to the retrieve request. For example, the object rebuilder 206 can communicate a compound request to the protocol processor that requests the protocol processor to GET the at risk object and then PUT the retrieved object upon completion of the GET request.

Returning to FIG. 1, the rebuild node at rack 115 has been assigned a namespace region that encompasses objects OBJ1-OBJM. For simplicity of illustration, the namespace for FIG. 1 is divided by integer division of hashed object identifiers instead of a modulo operation. FIG. 1 illustrates a point in time when the rebuild node at rack 115 has determined that all 15 fragments for OBJ1 are available in the storage system. The rebuild node at rack 115 maintains fragment inventory 123 for objects in its assigned namespace region. The rebuild node has determined that fragments 1-3 are not available for OBJ2. Assuming the rebuild node deems an object at risk if only 12 fragments are unavailable (or 3 fragments are not available), the rebuild node will rebuild OBJ2 at stage C. Depending on programming/policy/risk level, rebuild of OBJ2 may be requested immediately or may be scheduled based on degree of risk relative to other objects and/or opportunity (e.g., rebuild for a low risk object may be requested during an idle time). The rebuild node at rack 119 has been assigned a namespace region that encompasses objects OBJM+1 to OBJN. The rebuild node at rack 119 maintains fragment inventory 125 for objects in its assigned namespace region. FIG. 1 illustrates a point in time when the rebuild node at rack 119 has determined that fragment 6 is unavailable for OBJ M+1 the rebuild node is still receiving object fragment information for OBJM+2. The rebuild node at rack 119 determines that OBJ is not at risk so no rebuild is requested.

Figure 3:
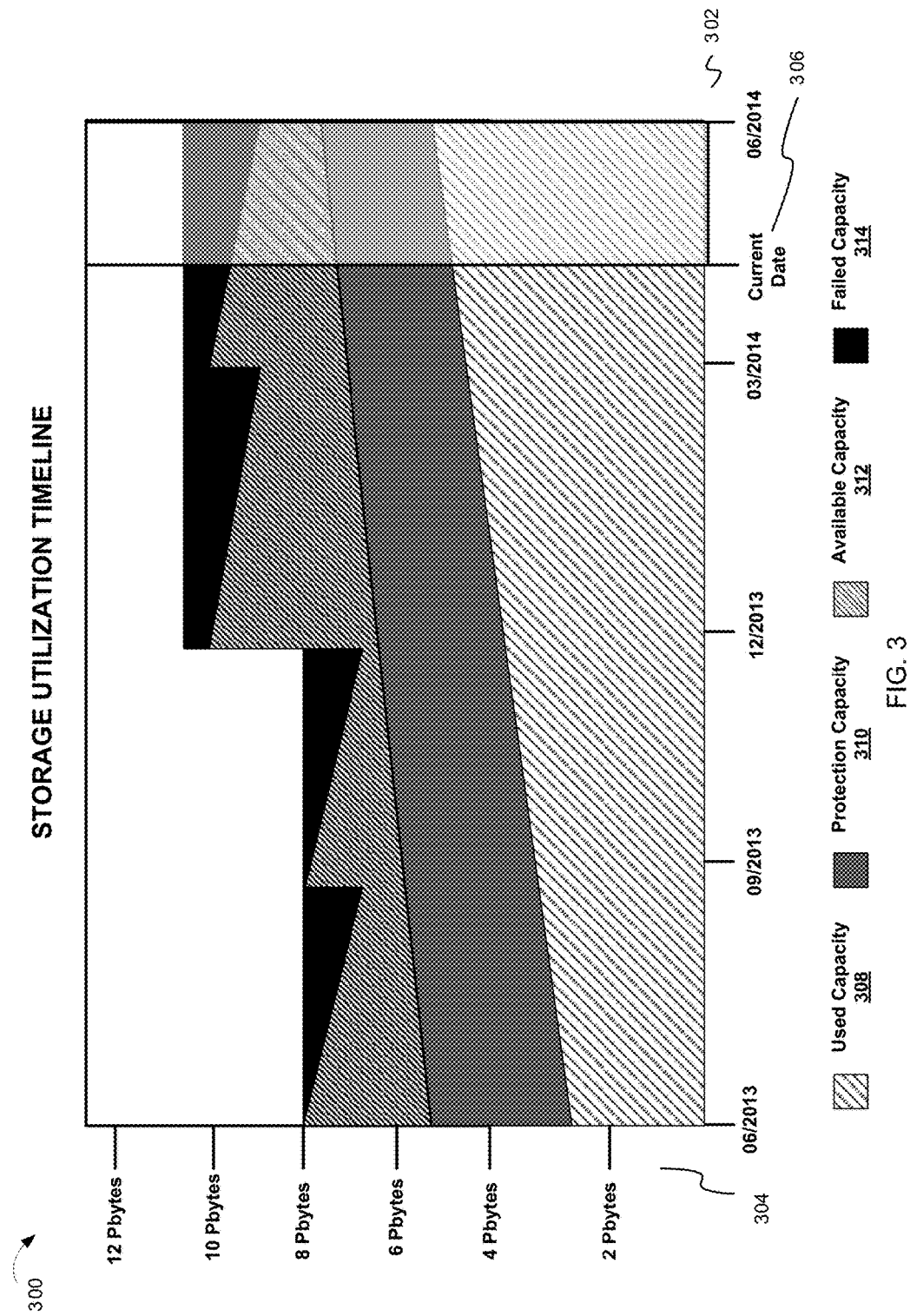
FIG. 3 depicts a first example storage utilization timeline for a distributed storage system.
Figure 4:
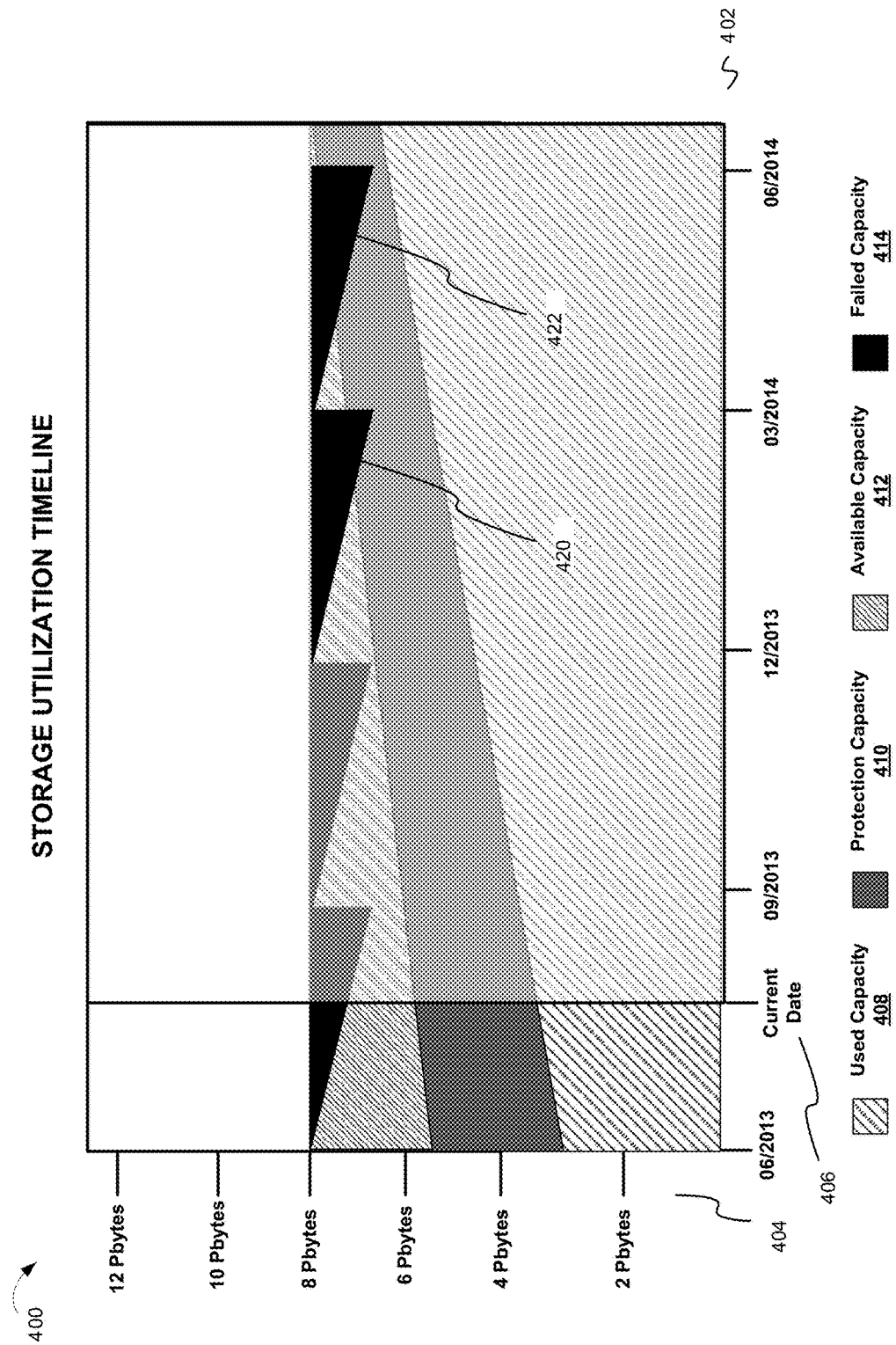
FIG. 4 depicts a second example storage utilization timeline for a distributed storage system.
Figure 5:
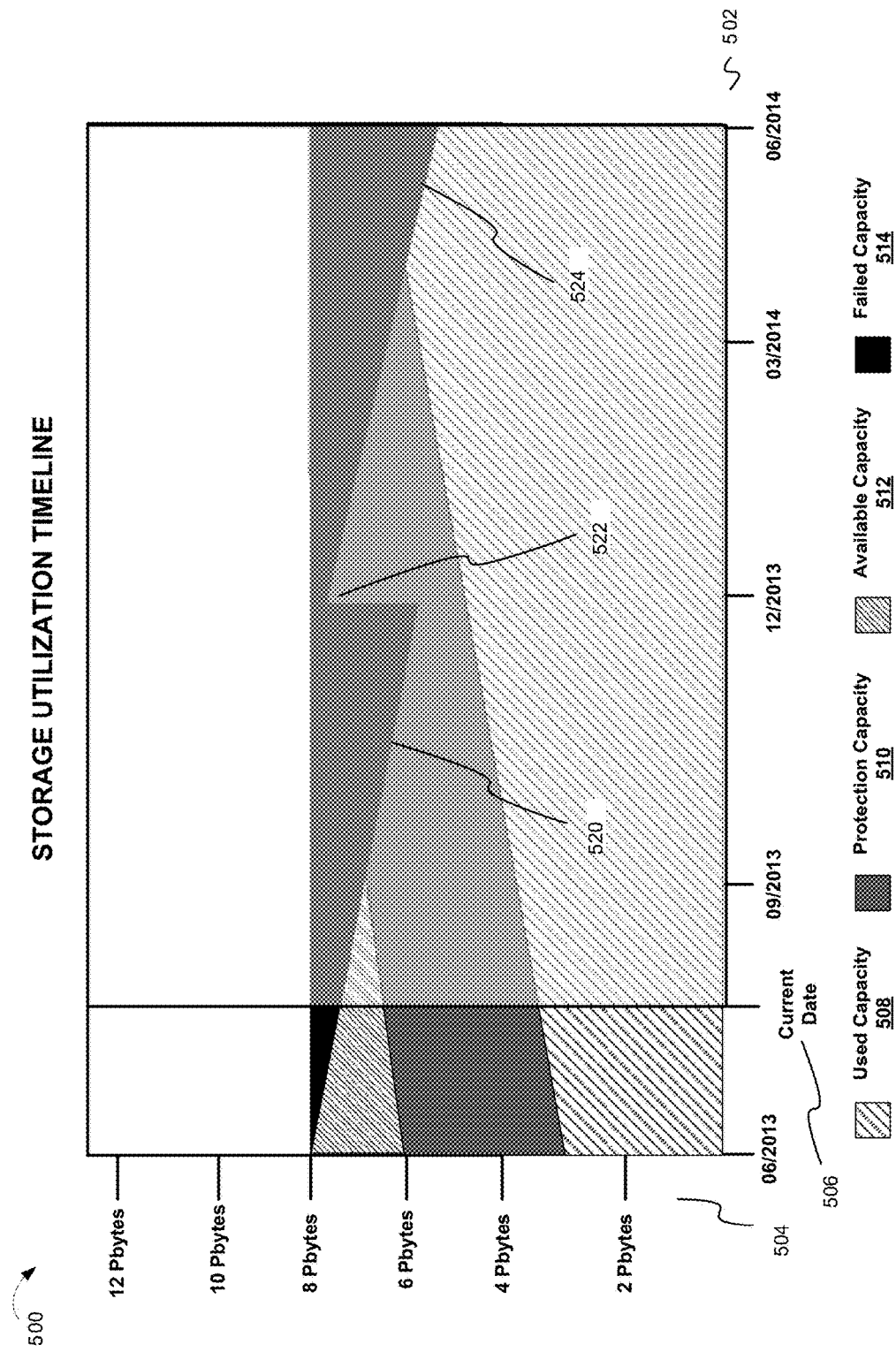
FIG. 5 depicts a third example storage utilization timeline for a distributed storage system.
Figure 6:
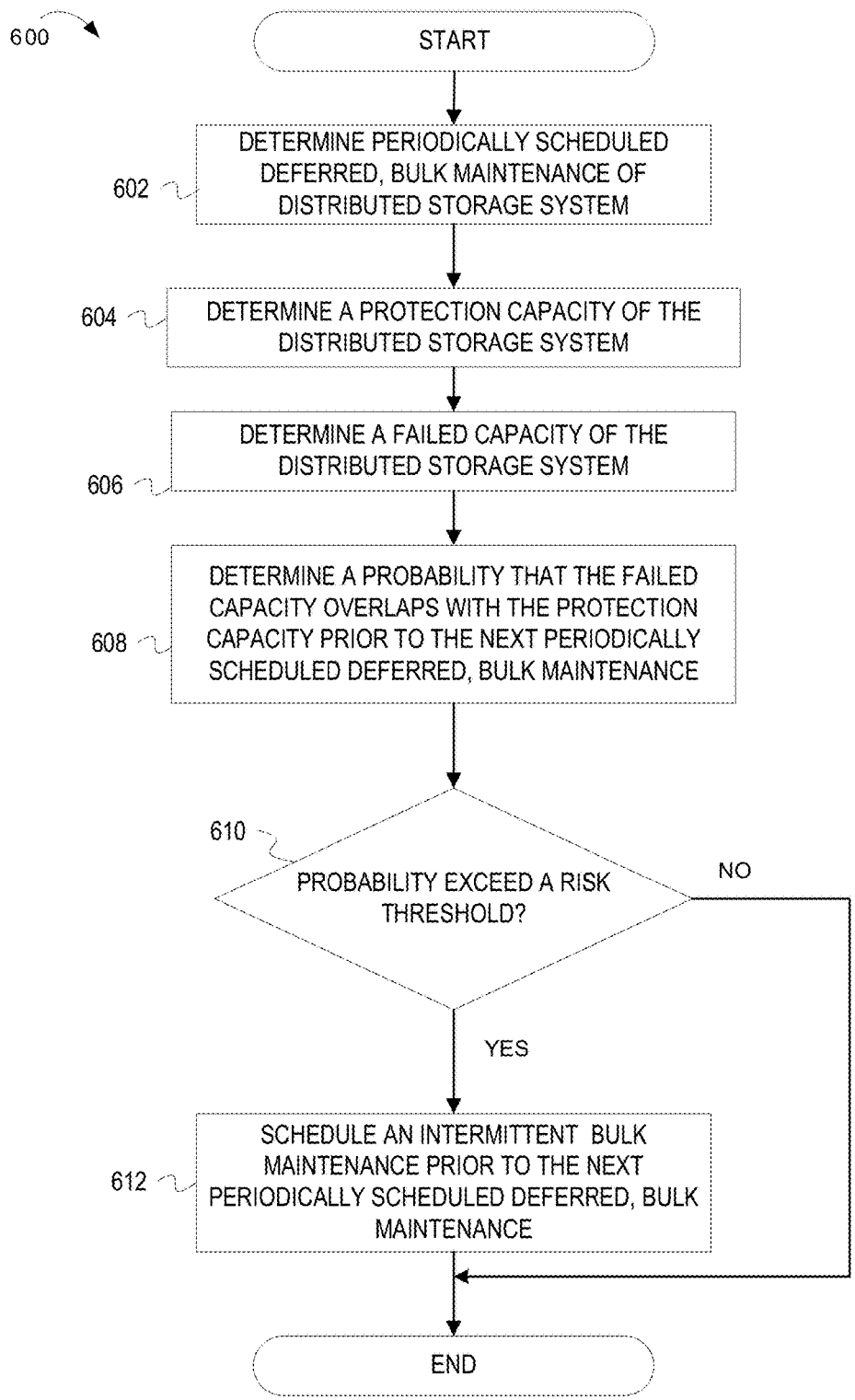
FIG. 6 depict a flowchart of example operations for scheduling an intermittent bulk maintenance between periodically scheduled deferred, bulk maintenances based on storage utilization.

Although FIG. 1 provides an example context for risk based background object rebuild in an erasure coded storage system, the following flowcharts elaborate on the operations for risk assessment based background rebuild and quantifying risk. FIGS. 3-4 provide flowcharts of example operations for background risk assessment for rebuild of objects. FIGS. 5-6 provide flowcharts of example operations for fragment based risk quantification for object loss. These figures refer to a rebuild node as performing the operations.

Example Usable Storage Utilization Timelines

Three different example storage utilization timelines for a distributed storage system are now described. These example timelines help illustrate predictive deferred, bulk maintenance based on failed and used storage capacities whose projections can be derived from past failure rates and usage rate trends, and can be used to inform an operator to assist in bulk deferred maintenance planning.

FIG. 3 depicts a first example storage utilization timeline for a distributed storage system. In this example, periodically scheduled bulk, deferred maintenances occur such that no intermittent maintenances are needed based on the storage utilization.

A storage utilization timeline 300 depicts storage utilization over time with an X-axis 302 tracking time in terms of months and a Y-axis 304 tracking storage utilization. The storage utilization timeline 300 includes four different storage utilizations—a used capacity 308, a protection capacity 310, an available capacity 312, and a failed capacity 314. The used capacity 308 represents storage across the distributed storage system that is storing data and thus is not available to store new data. The available capacity 312 represents storage across the distributed storage system that is available to store data. The failed capacity 314 represents storage across the distributed storage system that has failed and is not available to store data. The data in the failed capacity 314 can include object fragments and protection fragments whose object may need to be rebuilt using the available capacity 312 and protection capacity 310 (as described above in the description of FIGS. 1-2). The protection capacity 310 represents storage across the distributed storage system available to store protection fragments used to protect the data against loss. The available capacity 312 represents a buffer between the failed capacity 314 and the protection capacity 310 that permits new data to be stored and rebuilds to be performed. Once the failed capacity 314 enters the range defined by the protection capacity 310, no new data may be stored, and no object rebuilds can be performed without deleting existing data and/or protection data. To avoid this situation, a deferred, bulk maintenance may be scheduled. This deferred, bulk maintenance may be scheduled prior to a next periodically scheduled maintenance that was previously scheduled. This scheduling may be required because there is a risk of not being able to rebuild objects having at least some fragments in the failed capacity using available capacity, because there is a risk of not being able to store new data, or because there is a risk of being unable to maintain desired level of protection for stored data.

To help illustrate, the dates along the X-axis 302 relative to the different capacities are now described. Periodically scheduled maintenances in this example are made every three months (06/2013, 09/2013, 12/2013, 03/2014, and 06/2014). A current date 306 is depicted between 03/2014 and 06/2014. The storage utilization to the left of the current date 306 represents historical data of past failures and usage rates. The storage utilization to the right of the current date 306 represents future projections based on the current maintenance plans and based on projected failure and usage projections (which are derived from past failures and usage rates). Thus, the timeline 300 not only illustrates past storage utilization but also future storage utilization. The future storage utilization can be based on predictive trending defined by past failures and usage rates of the distributed storage system.

At the date 06/2013, there is essentially no failed capacity 314, over two petabytes of the available capacity 312, approximately two petabytes of the protection capacity 310, and over two petabytes of the used capacity 308. Between 06/2013 and the next scheduled maintenance at 09/2103, the failed capacity 314 increases while the available capacity 312 decreases over time during this period. The used capacity 308 also increases over time, while the protection capacity 310 remains constant during this period. In other embodiments, the protection capacity may increase proportional to the used capacity.

At the date 09/2013, a periodically scheduled maintenance of the distributed storage system occurs. During this periodically scheduled maintenance, failed storage is repaired. For example, failed storage drives are replaced with operable storage devices, lost connectivity with storage drives is restored, etc. As a result, the system returns to essentially having no failed capacity 314 and over two petabytes of the available capacity 312. The used capacity 308 continues to increase over time, while the protection capacity 310 remains constant during this period.

At the date 12/2013, another periodically scheduled maintenance of the distributed storage system occurs. During this periodically scheduled maintenance, at least a portion of the failed storage is repaired. As a result, the amount of failed capacity has been greatly reduced. In contrast to the previous periodically scheduled maintenance, this periodically scheduled maintenance also includes storage expansion. For example, additional storage drives can be added to a current storage node, new storage nodes with additional storage drives can be added, etc. As a result, over two petabytes of the available capacity 312 has been added. Storage expansion is needed for this periodically scheduled maintenance because the used capacity 308 continues to increase. The continued increase in used capacity 308 over time causes the failed capacity 314 to come closer to the protection capacity 310. As described above, once the failed capacity 314 nears or overlaps with the protection capacity 312 an intermittent maintenance can be scheduled prior to the next periodically scheduled maintenance. The protection capacity 310 remains constant during this period.

At the date 03/2014, another periodically scheduled maintenance of the distributed storage system occurs. During this periodically scheduled maintenance, at least a portion of the failed storage is repaired. As a result, the amount of failed capacity has been greatly reduced and over two petabytes of the available capacity 312 are now available. The used capacity 308 continues to increase over time, while the protection capacity 310 remains constant during this period. Therefore, in this example, no intermittent maintenances are scheduled between the periodically scheduled maintenances.

FIG. 4 depicts a second example storage utilization timeline for a distributed storage system. In this example, periodically scheduled bulk, deferred maintenances occur such that intermittent maintenances are needed based on the storage utilization.

A storage utilization timeline 400 depicts storage utilization over time with an X-axis 402 tracking time in terms of months and a Y-axis 404 tracking storage utilization. Similar to the storage utilization timeline 300 depicted in FIG. 3, the storage utilization timeline 400 includes four different storage utilizations—a used capacity 408, a protection capacity 410, an available capacity 412, and a failed capacity 414. Once the failed capacity 414 nears or enters the range defined by the protection capacity 410, a deferred, bulk maintenance may be scheduled. This deferred, bulk maintenance may be scheduled prior to a next periodically scheduled maintenance that was previously scheduled. This scheduling may be required because there is a risk of not being able to store new objects, rebuild objects having at least some fragments in the failed capacity using available capacity, or maintain the desired level of protection for stored data.

The dates along the X-axis 402 relative to the different capacities are now described. Periodically scheduled maintenances in this example are made every three months (06/2013, 09/2013, 12/2013, 03/2014, and 06/2014). A current date 406 is depicted between 06/2013 and 09/2013. Thus, the timeline 400 is projecting storage utilization beyond the current date 406 based on past failure and utilization trends for the distributed storage system whose storage utilization is being depicted in the timeline 400.

At the date 06/2013, there is essentially no failed capacity 414, over two petabytes of the available capacity 412, approximately two petabytes of the protection capacity 410, and over two petabytes of the used capacity 408. Between 06/2013 and the next scheduled maintenance at 09/2103, the failed capacity 414 increases while the available capacity 412 decreases over time during this period. The used capacity 408 also increases over time, while the protection capacity 410 remains constant during this period.

At the date 09/2013, a periodically scheduled maintenance of the distributed storage system is scheduled to occur. During this periodically scheduled maintenance, failed storage is repaired. For example, failed storage drives are replaced with operable storage devices, lost connectivity with storage drives is restored, etc. As a result, the system returns to essentially having no failed capacity 414 and over two petabytes of the available capacity 412. The used capacity 408 continues to increase over time, while the protection capacity 410 remains constant during this period.

At the date 12/2013, another periodically scheduled maintenance of the distributed storage system occurs. During this periodically scheduled maintenance, failed storage is repaired. As a result, the system returns to essentially having no failed capacity 414 and an approximately two petabytes of the available capacity 412. In this example, the continued increase in the used capacity 408 over time causes the failed capacity 414 to overlap with the protection capacity 410 (see 420). As described above, once the failed capacity 414 overlaps with the protection capacity 412 an intermittent maintenance can be scheduled prior to the next periodically scheduled maintenance. Thus, an intermittent maintenance would be scheduled prior to the next periodically scheduled maintenance on the date 03/2014. The intermittent maintenance can be scheduled to occur immediately or any time prior to the next periodically scheduled maintenance. Changes to the storage utilization timeline 400 do not reflect execution of the intermittent maintenance. However, the intermittent maintenance can include repairs to failed storage devices, repair of broken communications with storage devices, etc. (thereby reducing the failed capacity 414). The intermittent maintenance can also include adding of storage devices to existing storage nodes, adding of storage nodes with additional storage devices, etc. to increase the amount of the available capacity 412.

At the date 03/2014, another periodically scheduled maintenance of the distributed storage system occurs. During this periodically scheduled maintenance, failed storage is repaired. As a result, the system returns to essentially having no failed capacity 414 and an approximately two petabytes of the available capacity 412. Again, the continued increase in the used capacity 408 over time causes the failed capacity 414 to overlap with the protection capacity 410 (see 422). As described above, once the failed capacity 414 overlaps with the protection capacity 412 an intermittent maintenance can be scheduled prior to the next periodically scheduled maintenance. Thus, an intermittent maintenance would be scheduled prior to the next periodically scheduled maintenance on the date 06/2014. Changes to the storage utilization timeline 400 do not reflect execution of the intermittent maintenance, but may be included when displayed to a system operator. However, the intermittent maintenance can include repairs to failed storage devices, repair of broken communications with storage devices, etc. (thereby reducing the failed capacity 414). The intermittent maintenance can also include adding of storage devices to existing storage nodes, adding of storage nodes with additional storage devices, etc. to increase the amount of the available capacity 412.

FIG. 5 depicts a third example storage utilization timeline for a distributed storage system. In this example, periodically scheduled bulk, deferred maintenances occur such that intermittent maintenances are needed based on the storage utilization. This third example depicts the distributed storage system being in a worse condition than in the second example. Specifically, in this example, because of the storage utilization relative to the periodically scheduled bulk, deferred maintenances, the failed capacity overlaps with the used capacity. This overlap results in system being unable to access or rebuild objects as described above in reference to FIGS. 1-2, which results in permanent data loss unless protection fragments can be obtained from another external storage system.

A storage utilization timeline 500 depicts storage utilization over time with an X-axis 502 tracking time in terms of months and a Y-axis 504 tracking storage utilization. Similar to the storage utilization timeline 300 depicted in FIG. 3, the storage utilization timeline 500 includes four different storage utilizations—a used capacity 508, a protection capacity 510, an available capacity 512, and a failed capacity 514. Once the failed capacity 514 enters or nears the range defined by the protection capacity 510, a deferred, bulk maintenance may be scheduled. This deferred, bulk maintenance may be scheduled prior to a next periodically scheduled maintenance that was previously scheduled. This scheduling may be required because there is a risk of not being able to rebuild objects having at least some fragments in the failed capacity using available capacity.

The dates along the X-axis 502 relative to the different capacities are now described. Periodically scheduled maintenances in this example are made every six months (06/2013, 12/2013, and 06/2014). A current date 506 is depicted between 06/2013 and 09/2013. Thus, the timeline 500 is projecting storage utilization beyond the current date 506 based on past failure and utilization trends for the distributed storage system whose storage utilization is being depicted in the timeline 500.

At the date 06/2013, there is essentially no failed capacity 514, approximately two petabytes of the available capacity 512, over two petabytes of the protection capacity 510, and over two petabytes of the used capacity 508. Between 06/2013 and the next scheduled maintenance at 12/2103, the failed capacity 514 increases while the available capacity 512 decreases over time during this period. The used capacity 508 also increases over time, while the protection capacity 510 remains constant during this period. In this example, the continued increase in the used capacity 508 over time causes the failed capacity 514 to overlap with the protection capacity 510 (see 520). Once the failed capacity 514 overlaps with the protection capacity 510, the rebuilding of objects (described in reference to FIGS. 1-2) is deferred until the overlapping is corrected, and new data can only be stored by reducing level of protection for stored data.

Thus, once the failed capacity 514 overlaps with the protection capacity 512 an intermittent maintenance can be scheduled prior to the next periodically scheduled maintenance. In this example, an intermittent maintenance would be scheduled prior to the next periodically scheduled maintenance on the date 12/2013. The intermittent maintenance can be scheduled to occur immediately or any time prior to the next periodically scheduled maintenance. Changes to the storage utilization timeline 500 do not reflect execution of the intermittent maintenance. However, the intermittent maintenance can include repairs to failed storage devices, repair of broken communications with storage devices, etc. (thereby reducing the failed capacity 514). The intermittent maintenance can also include adding of storage devices to existing storage nodes, adding of storage nodes with additional storage devices, etc. to increase the amount of the available capacity 512.

At the date 12/2013. another periodically scheduled maintenance of the distributed storage system is scheduled to occur. During this periodically scheduled maintenance, failed storage is repaired. As a result, the system returns to essentially having minimal failed capacity 514. However, there is still essentially no available capacity 512 remaining. The periodically scheduled maintenance was only able to move the failed capacity 514 to an upper point in the protection capacity (see 522). Thus, an intermittent maintenance would be scheduled prior to the next periodically scheduled maintenance on the date 06/2014. The intermittent maintenance can be scheduled to occur immediately or any time prior to the next periodically scheduled maintenance.

Changes to the storage utilization timeline 500 do not reflect execution of the intermittent maintenance. Therefore, the failed capacity 514 continues to increase until the failed capacity is beyond the protection capacity 510 and is now overlapping with the used capacity 508 (see 524). This overlap results in system being unable to rebuild or read objects as described above in reference to FIGS. 1-2. This example depicted in FIG. 5 illustrates that in some situations, maintenance that only includes repairs is not sufficient. Rather, storage expansion is needed to increase the available capacity 512, thereby providing a bigger difference between the failed capacity 512 and the used capacity 508. An example where storage expansion is included in a periodically scheduled maintenance is depicted at the date 12/2013 of FIG. 3.

Example Deferred, Bulk Maintenance Operations

To further illustrate deferred, bulk maintenance triggered by storage utilization depicted in the storage utilization timelines in FIGS. 3-5, FIG. 6 depict a flowchart of example operations for scheduling an intermittent bulk maintenance between periodically scheduled deferred, bulk maintenances based on storage utilization. A flowchart 600 is described with reference to FIGS. 3-5. Operations of the flowchart 600 can be performed by software, firmware, hardware or a combination thereof (see for example a maintenance scheduler 811 depicted in FIG. 8, described below). The operations of the flowchart 600 can be executed periodically between periodically scheduled deferred, bulk maintenance events. For example, if periodically scheduled deferred, bulk maintenance occurs once every three months, the operations can be executed once a day, once an hour, once a week, etc. The operations of the flowchart 600 start at block 602.

At block 602, periodically scheduled deferred, bulk maintenance is determined for a distributed storage system. For example, the scheduling can be determined for a distributed storage system as described in reference to FIGS. 1-2 in which a data object is stored in a number of fragments across different storage devices in different storage nodes. The periodically scheduled deferred, bulk maintenance can be determined based on past failure and usage rates for this particular distributed storage system and/or a similar one having a similar configuration and components. This periodic schedule can be set by an administrator of the distributed storage system and can be based on projections provided by the storage utilization timeline associated with the distributed storage system. With reference to the example depicted in FIG. 3, the past failure and usage rates would project that periodically scheduled deferred, bulk maintenance that includes repairs to failed storage devices needs to occur once every three months. Also, as part of the periodically scheduled deferred, bulk maintenance once every six months, a storage expansion needs to be added because the used capacity 308 continues to grow over time. Such a scheduling precludes the failed capacity 314 from overlapping with the protection capacity 310. Alternatively or in addition to an administrator performing the scheduling, a module or process can also perform this scheduling based on past failures and usage rates.

At block 604, a protection capacity of the distributed storage system is determined. The amount of protection capacity across the distributed storage system can be retrieved from a management device or management node monitoring usage of the storage across the different storage nodes of the distributed storage system. With reference to FIG. 3, the protection capacity 310 can be determined.

At block 606, a failed capacity of the distributed storage system is determined. The amount of failed capacity across the distributed storage system can also be retrieved from a management device or management node monitoring failed storage devices, failed racks of storage devices, storage devices with no connectivity, etc. across the different storage nodes of the distributed storage system. With reference to FIG. 3, the used capacity 314 can be determined.

At block 608, a probability that the failed capacity will overlap the protection capacity prior to the next periodically scheduled deferred, bulk maintenance is determined. With reference to FIG. 5, a determination is made of whether the point 524 in the storage utilization timeline 500 occurs prior to 06/2014—the date of the next periodically scheduled deferred, bulk maintenance. The probability can be based on the past failure and usage rates in the distributed storage system. In determining the probability, more weight can be assigned to more recent failures and usage activity. For example, if a number of storage devices have started failing in the last week, these failures can increase the probability that the failed capacity will overlap with the used capacity will occur. Also, projecting failure of a storage device can be based on its location and other common-mode failure domains where failures may be correlated. For example, the probability of storage devices failing can be increased based on proximity of the storage devices to storage devices that have already failed. In particular, storage devices subjected to the same ambient conditions (e.g., temperature) can be more likely to fail at or near a same time. As the probability of storage devices failing increases, the probability that the failed capacity will overlap the used capacity will also increase. Probability calculations can also be take into account worst case failure possibilities. For example, the complete failure of a storage node is equivalent to the failure of all of the storage devices attached to that storage node. The probability can take into account making sure that such a failure does not result in the failed capacity overlapping with the protection capacity or used capacity.

Additionally, projecting failure of a storage device can be based on the type of device, its manufacturer, how long the device has been in operation, the rate or amount of Input/Output (I/O) operations the device has been processing, latencies, errors returned, device wear, etc. For example, based on past monitoring, a storage device of type X from manufacturer Y has a high likelihood of failing after being in operation more than M length of time and/or after N number of I/O operations. Thus, if storage devices from manufacturer Y have not yet failed but have been operating more than M length of time, the likelihood of failure of the storage devices is defined as high. Similarly, if storage devices of type X from any manufacturer have not yet failed but have executed more than N number of I/O operations, the likelihood of failure of the storage devices is defined as high. These storage devices with a high likelihood of failure can be projected as failing prior to the next periodically scheduled deferred, bulk maintenance, depending on how close in time this next scheduled maintenance is to occur. As storage devices are projected to fail, the probability that the failed capacity will overlap with the protection or used capacity will become greater.

The projected used capacity can also affect whether the failed capacity will overlap the protection or used capacity prior to the next periodically scheduled deferred, bulk maintenance. For example, if there is a high probability that used capacity is projected to increase beyond a typical average increase, then the probability can increase for the overlap to occur prior to the next periodically scheduled deferred, bulk maintenance. Projected usage rates can vary based on the types of data projected to be stored, the type of clients consuming the capacity, the time of year or month, etc. For example, certain clients may consume more data at certain times of the year. Thus, these projected usage rates can vary. Therefore, a probability that the failed capacity will overlap the protection or used capacity prior to the next periodically scheduled deferred, bulk maintenance can be determined based on a number of criteria related to projected failures and projected usage rates in the distributed storage system.

At block 610, a determination is made of whether the probability that the failed capacity will overlap the protection or used capacity prior to the next periodically scheduled deferred, bulk maintenance exceeds a risk threshold. The risk threshold can be a configurable value that can be based on different criteria. For example, the risk threshold can be set lower for a newly installed storage system in comparison to a storage system that has a long history of past failures and usage rates. The risk threshold can also be greater for a larger storage system than a smaller one. If the probability that the failed capacity will overlap the protection or used capacity prior to the next periodically scheduled deferred, bulk maintenance does not exceed the risk threshold, operations of the flowchart 600 are complete. Otherwise, operations of the flowchart 600 continue at block 612.

At block 612, an intermittent bulk maintenance is scheduled prior to a next periodically scheduled deferred, bulk maintenance. The intermittent bulk maintenance can be scheduled to occur immediately or any time prior to the next periodically scheduled deferred, bulk maintenance. The scheduling can include notifying personnel of the timing and what tasks need to be performed. For example, the intermittent bulk maintenance can include replacing failed storage devices with operative ones or adding new storage devices to expand the storage in the distributed storage system.

Operations at block 608 monitor the probability that the failed capacity overlaps with the protection capacity prior to the next periodically scheduled deferred, bulk maintenance. Alternatively or in addition, operations of the flowchart 600 can also monitor the probability that the failed capacity overlaps with the used capacity prior to the next periodically scheduled deferred, bulk maintenance. If this probability exceeds a same or different risk threshold, an intermittent bulk maintenance is also scheduled prior to a next periodically scheduled deferred, bulk maintenance. In some aspects, this additional intermittent bulk maintenance scheduling can have a higher priority that the intermittent bulk maintenance scheduled at block 612. For example, the intermittent bulk maintenance scheduled at block 612 can be scheduled in a next week. Whereas, this intermittent bulk maintenance scheduled for the probability that the failed capacity overlaps the used capacity exceeding a risk threshold can be scheduled immediately.

The plan can be provided to the personnel who are to perform the intermittent bulk maintenance. To help illustrate, FIG. 7 depicts an example Graphical User Interface (GUI) display of a bulk maintenance schedule plan. A GUI display 700 can be displayed on a device (smart phone, tablet device, etc.) associated with personnel performing the maintenance.

The GUI display 700 includes a first section—a procedures section 702. The procedures 702 includes a list of procedures that are to be performed as part of bulk maintenance. In this example, the list of procedures includes an expansion 704, a component replacement #1 706, and a component replacement #2 708. The expansion 704 provides instructions and a schedule for adding storage devices to the distributed storage system. The component replacement #1 706 and the component replacement #2 708 provides instructions and a schedule for repairing failed components (e.g., storage devices, racks of storage devices, etc.) in the distributed storage system.

Detailed instructions for the expansion 704 are provided in the expansion section 710. The expansion section 710 includes a list of detailed instructions 712, which includes 10 steps in this example. An example detailed instruction could include an instruction to install a particular type of storage devices into an empty slot of a particular rack at a defined location.

Detailed instructions for the component replacement #1 706 are provided in a component replacement section 714. The component replacement section 714 includes a list of detailed instructions 716, which includes two steps in this example. Detailed instructions for the component replacement #2 708 are provided in a component replacement section 718. The component replacement section 718 includes a list of detailed instructions 720, which also includes two steps in this example. An example detailed instruction for component replacement could include an instruction to replace a storage device in a particular rack at a defined location with an operable storage device.

While not shown, the GUI 700 could also include components to receive input from the user. For example, the GUI 700 could include buttons to be selected after a task provided by a detailed instruction is complete. The GUI 700 could then be configured to provide these inputs to a maintenance scheduler to tracking the completion of the bulk maintenance.

Example Computer Device

Figure 8:
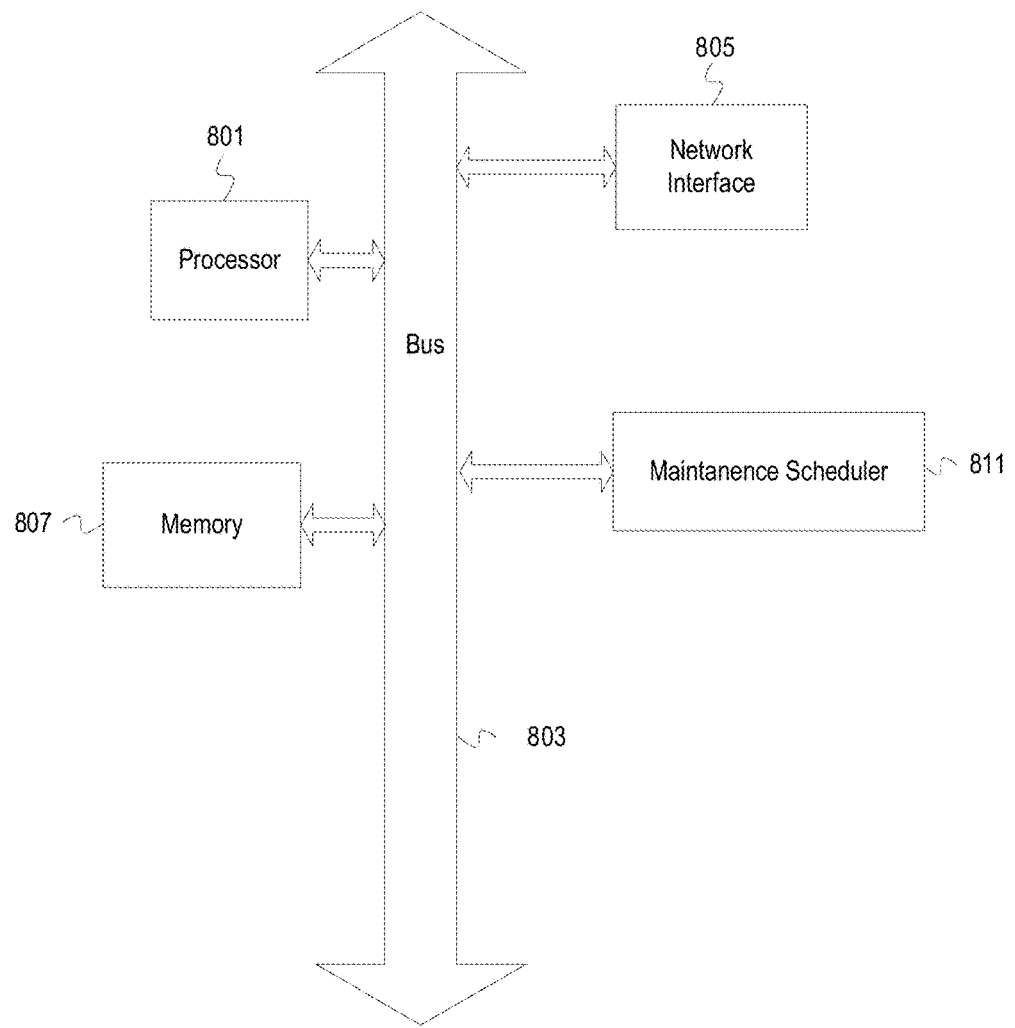
FIG. 8 depicts an example computer system for deferred, bulk maintenance.

FIG. 8 depicts an example computer system for deferred, bulk maintenance. The computer device includes a processor 801 (possibly including multiple processors, multiple cores, multiple nodes, and/or implementing multi-threading, etc.). The computer system includes memory 807. The memory 807 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 803 (e.g., PCI, ISA, PCI-Express, Hyper-Transport® bus, InfiniBand® bus, NuBus, etc.) and a network interface 805 (e.g., a Fiber Channel interface, an Ethernet interface, an interne small computer system interface, SONET interface, wireless interface, etc.). The system communicates via transmissions to and/or from remote devices via the network interface 1005 in accordance with a network protocol corresponding to the type of network interface, whether wired or wireless and depending upon the carrying medium. In addition, a communication or transmission can involve other layers of a communication protocol and or communication protocol suites (e.g., transmission control protocol, Internet Protocol, user datagram protocol, virtual private network protocols, etc.).

The system also includes a maintenance scheduler 811. The maintenance scheduler 811 monitors risk assessment based on trend projections and schedules deferred, bulk maintenance. Any one of the previously described functionalities may be partially (or entirely) implemented in hardware and/or on the processor 801. For example, the functionality may be implemented with an application specific integrated circuit, in logic implemented in the processor 801, in a co-processor on a peripheral device or card, etc. Further, realizations may include fewer or additional components not illustrated in FIG. 8 (e.g., video cards, audio cards, additional network interfaces, peripheral devices, etc.). The processor 801 and the network interface 805 are coupled to the bus 803. Although illustrated as being coupled to the bus 803, the memory 807 may be coupled to the processor 801.

Variations

The examples refer to "nodes," both rebuild nodes and storage nodes. The node is a construct used to refer to implementation of functionality for background rebuild based on object loss risk assessment. This construct is utilized since numerous implementations are possible. A node may be a particular component or components of a machine (e.g., a particular circuit card enclosed in a housing with other circuit cards/boards), machine-executable program or programs, a circuit card with circuitry configured and programmed for background rebuild based on object loss risk assessment, etc. The term is used to efficiently explain content of the disclosure. Although the examples refer to operations being performed by a rebuild node, different entities can perform different operations. For instance, a dedicated co-processor or application specific integrated circuit can quantify risk while another processor/core/process collects fragment information.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operation(s) represented by block 411 may not be performed. A rebuild node may not prioritize rebuild of objects within a range and concurrently request rebuild for all of the at risk objects within the object range. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in machine-readable medium(s). Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as fragment of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

While the aspects of the disclosure are described with reference to various implementations and exploitations, it will be understood that these aspects are illustrative and that the scope of the claims is not limited to them. In general, techniques for background risk assessment to drive object rebuild as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
determining a failed capacity of a distributed storage system, wherein the distributed storage system includes a plurality of storage nodes, wherein the plurality of storage nodes include at least one storage device to store data objects, wherein the data objects are divided into data fragments in the distributed storage system;
determining a protection capacity of the distributed storage system, wherein the protection capacity comprises storage configured to store at least a portion of the data fragments generated to allow the data objects to be rebuilt in response to at least a part of the data objects being either lost or corrupted;
determining a first probability that the failed capacity overlaps with the protection capacity of the distributed storage system prior to a next periodically scheduled maintenance of the distributed storage system;
determining whether the first probability exceeds a first risk threshold; and
in response to the first probability exceeding the first risk threshold, scheduling a next maintenance of the distributed storage system that comprises reducing the failed capacity.

2. The method of claim 1, further comprising:
determining a used capacity of the distributed storage system;
determining a second probability that the failed capacity overlaps with the used capacity;
determining whether the second probability exceeds a second risk threshold; and
in response to the second probability exceeding the second risk threshold, scheduling a high priority maintenance of the distributed storage system that comprises reducing the failed capacity.

3. The method of claim 1, wherein reducing the failed capacity comprises replacing any failed storage drives with operative storage drives.

4. The method of claim 1, further comprising:
in response to the first probability not exceeding the first risk threshold, deferring reducing the failed capacity until a subsequent periodic scheduled maintenance of the distributed storage system.

5. The method of claim 1, wherein the next maintenance is prior to the next periodically scheduled maintenance of the distributed storage system.

6. The method of claim 1, wherein the determining of the first probability is based, at least in part, on a past failure rate of storage devices in the distributed storage system.

7. The method of claim 1, wherein the determining of the first probability is based, at least in part, on a past usage rate of the storage devices in the distributed storage system.

8. The method of claim 1, wherein the next maintenance of the distributed storage system comprises increasing an available storage capacity.

9. A non-transitory machine readable medium having stored thereon instructions for performing a method comprising machine executable code which when executed by at least one machine, causes the at least one machine to:
determine a failed capacity of the distributed storage system, wherein the distributed storage system includes a plurality of storage nodes, wherein the plurality of storage nodes include at least one storage device to store data objects, wherein the data objects are divided into data fragments in the distributed storage system;
determine a protection capacity of the distributed storage system, wherein the protection capacity comprises storage configured to store at least a portion of the data fragments generated to allow the data objects to be rebuilt in response to at least a part of the data objects being either lost or corrupted;
determine a first probability that the failed capacity overlaps with the protection capacity of the distributed storage system prior to a next periodically scheduled maintenance of the distributed storage system;
determine whether the first probability exceeds a first risk threshold; and
in response to the probability exceeding the risk threshold, schedule the next maintenance of the distributed storage system that comprises a reduction of the failed capacity.

10. The non-transitory machine-readable storage medium of claim 9, further comprising machine executable code which when executed by the at least one machine, causes the at least one machine to:
determine a used capacity of the distributed storage system;
determine a second probability that the failed capacity overlaps with the used capacity;
determine whether the second probability exceeds a second risk threshold; and
in response to the second probability exceeding the second risk threshold, schedule a high priority maintenance of the distributed storage system that comprises the reduction of the failed capacity.

11. The non-transitory machine-readable storage medium of claim 9, wherein reduction of the failed capacity comprises replacement any failed storage drives with operative storage drives.

12. The non-transitory machine-readable storage medium of claim 9, further comprising machine executable code which when executed by the at least one machine, causes the at least one machine to:
in response to the first probability not exceeding the first risk threshold, defer reduction of the failed capacity until a subsequent periodic scheduled maintenance of the distributed storage system.

13. The non-transitory machine-readable storage medium of claim 9, wherein the next bulk maintenance is prior to the next periodically scheduled maintenance of the distributed storage system.

14. The non-transitory machine-readable storage medium of claim 9, wherein the machine executable code which when executed by at least one machine, causes the at least one machine to determine the first probability based, at least in part, on a past failure rate of storage devices in the distributed storage system.

15. The non-transitory machine-readable storage medium of claim 9, wherein the machine executable code which when executed by at least one machine, causes the at least one machine to determine the first probability based, at least in part, on a past usage rate of the storage devices in the distributed storage system.

16. The non-transitory machine-readable storage medium of claim 9, wherein the next maintenance of the distributed storage system comprises increasing an available storage capacity.

17. A computing device comprising:
a processor; and
a machine readable medium comprising machine executable code having stored thereon instructions executable by the processor to cause the computing device to:
determine a used capacity of a distributed storage system, wherein the distributed storage system includes a plurality of storage nodes, wherein the plurality of storage nodes include at least one storage device to store data objects, wherein the data objects are divided into constituent fragments in the distributed storage system;

determine a failed capacity of the distributed storage system;

determine a probability that the failed capacity overlaps with the used capacity of the distributed storage system prior to a next periodically scheduled maintenance of the distributed storage system;

determine whether the probability exceeds a risk threshold; and in response to the probability exceeding the risk threshold, schedule, prior to the next periodically scheduled maintenance, an intermittent bulk maintenance of the distributed storage system that comprises a reduction of the failed capacity.

18. The computing device of claim 17, wherein reduction of the failed capacity comprises replacement any failed storage drives with operative storage drives.

19. The computing device of claim 17, further comprising machine executable code executable by the processor to cause the computing device to:

in response to the probability not exceeding the risk threshold, defer reduction of the failed capacity until a subsequent periodic scheduled maintenance of the distributed storage system.

20. The computing device of claim 17, wherein the machine executable code executable by the processor to cause the computing device to determine the probability is based, at least in part, on a past failure rate of storage devices in the distributed storage system.

* * * * *